April 29, 1924.
W. S. DOE
BATTERY CAKE
Filed March 30, 1922
Fig. 1,
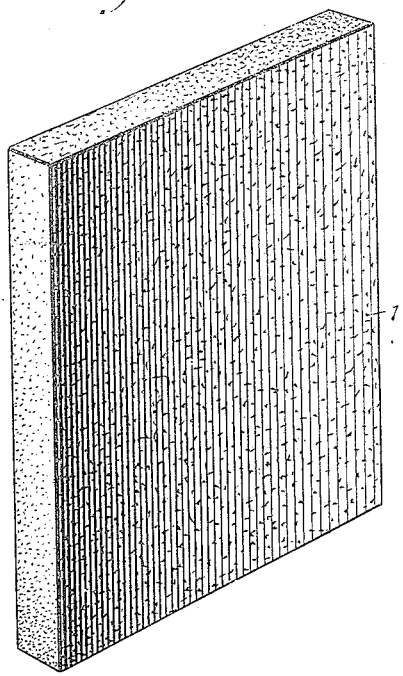
Fig. 2.
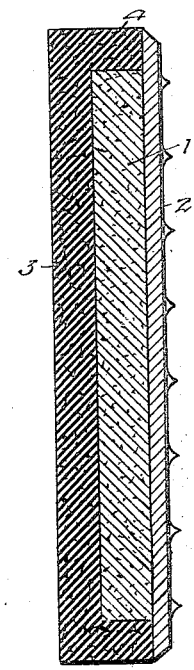
WITNESSES
Edw. Thorpe
Robert J. Helsig
INVENTOR
Walter Scott Doe
BY Munn & Co
ATTORNEYS Patented Apr. 29, 1924.

1,492,435

UNITED STATES PATENT OFFICE.

WALTER SCOTT DOE, OF KENT, OHIO.

BATTERY CAKE.

Application filed March 30, 1922. Serial No. 547,971.

*To all whom it may concern:*

Be it known that I, WALTER SCOTT DOE, a citizen of the United States, and a resident of Kent, in the county of Portage and State of Ohio, have invented a new and Improved Battery Cake, of which the following is a full, clear, and exact description.

The invention relates to a battery cake, and has for an object the provision of a simple, compressed, dry cake which can be sold and used to renew dry batteries or any other battery unit in a very simple and efficient manner Another object resides in the provision of a cake which, except for being moistened, is complete and ready to generate a current when placed between a positive and a negative element.

A further object resides in the provision of a cake which is simple and convenient for use in the renewal of batteries in such devices as electric lamps, flashlights, acoustic instruments, radio batteries, etc.

A still further object resides in the provision of a battery cake which because of the fact that it is dry and will not generate until moistened and placed between positive and negative elements, can be stored away in large quantities in stock without deterioration, if kept dry.

Another object is to minimize expense and add great convenience in marketing such a cake, which is used in the formation of a flat cell, such as a cell, for instance, as that described in my application for Letters Patent, Serial No. 466,035, filed May 2, 1921, and entitled "Renewable primary dry cell battery."

A further object resides in the particular construction and arrangement of parts which are hereinafter described and claimed and shown in the accompanying drawings.

The invention is illustrated in the drawings, of which—

Figure 1 is a perspective view of the cake.

Figure 2 shows the cake in position between the electro-elements to form a cell.

The form of the invention shown in the drawings is a preferred form, although it is understood that modifications in the construction and arrangement of the parts and in the character of the materials used may be adopted without departing from the spirit of the invention.

As illustrated in the drawings, the invention comprises a cake 1 shown as a rectangular block or cake, although the form of the cake is immaterial. This cake is made of any suitable material capable when moistened to cause the production of current when placed between a positive and negative element. The particular ingredients of which the cake is formed is immaterial, as the formula therefor may be changed to increase or decrease the internal resistance of the cell to suit it for various uses as desired.

In Fig. 2 is shown an illustrative form of cells involving the use of my compressed cake. This comprises an electrode 2, which may be an electro-positive element or a zinc plate acting as a cover for a second electrode 3, which may be an electro-negative element or carbon or graphite plate cup-shaped in form and having a circumferential flange 4 making the electrode 3 cup shape to receive within the cup or recess the cake 1. The cake, therefore, is held tightly enclosed within and between the two electrodes 2 and 3 and the combination of these three elements forms a cell.

This unit, by being constructed to receive the compressed cake, is capable of simple assembly and disassembly whereby the cakes may be very readily renewed at any time. In order to place this cake in condition for operative use, it is merely necessary to moisten it before placing it in the cell.

What I claim is:

A dry battery cell which comprises a cup-shaped electrode, a dry compressed cake disposed in the cup or recess of said electrode, said cake containing all the necessary ingredients to produce an electric current when moistened, the outer surface of said cake being flush with the edge of the cup-shaped electrode, and a second electrode comprising a cover plate to be disposed against the flat surface formed by the edge of the cap and the cake to form a cover for the cup and the cake to enclose the cake within the cup.

WALTER SCOTT DOE.